(12) United States Patent
Loyola Heufemann et al.

(10) Patent No.: US 11,477,236 B2
(45) Date of Patent: Oct. 18, 2022

(54) TREND-AWARE COMBO-SQUATTING DETECTION

(71) Applicant: INTERNATIONAL BUSINESS MACHINES CORPORATION, Armonk, NY (US)

(72) Inventors: Pablo Salvador Loyola Heufemann, Tokyo (JP); Kugamoorthy Gajananan, Tokyo (JP); Hirokuni Kitahara, Tokyo (JP); Yuji Watanabe, Tokyo (JP); Fumiko Akiyama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 16/884,176

(22) Filed: May 27, 2020

(65) Prior Publication Data
US 2021/0377306 A1   Dec. 2, 2021

(51) Int. Cl.
*H04L 51/046* (2022.01)
*H04L 9/40* (2022.01)
*G06N 3/04* (2006.01)
*G06N 7/00* (2006.01)
*H04L 67/01* (2022.01)

(52) U.S. Cl.
CPC ....... *H04L 63/1491* (2013.01); *G06N 3/0454* (2013.01); *G06N 7/005* (2013.01); *H04L 51/046* (2013.01); *H04L 63/1416* (2013.01); *H04L 63/1425* (2013.01); *H04L 67/01* (2022.05)

(58) Field of Classification Search
USPC ......................................................... 726/22
See application file for complete search history.

(56) References Cited

U.S. PATENT DOCUMENTS

| 2016/0352772 | A1  | 12/2016 | O'Connor |
| 2018/0139235 | A1  | 5/2018  | Desai et al. |
| 2020/0396204 | A1* | 12/2020 | Loyola ............. G06F 16/90344 |
| 2021/0051174 | A1* | 2/2021  | Kitahara ............. H04L 63/1483 |

OTHER PUBLICATIONS

Mell et al. "The NIST Definition of Cloud Computing", NIST Special Publication 800-145, 2011, 7 pages.
Kintis et al., "Hiding in Plain Sight: A Longitudinal Study of Combosquatting Abuse", arXiv:1708.08519v1 [cs.CR] Aug. 28, 2017, pp. 1-18.

* cited by examiner

*Primary Examiner* — Jude Jean Gilles
(74) *Attorney, Agent, or Firm* — Tutunjian & Bitetto, P.C.; Randall Bluestone

(57) ABSTRACT

A computer-implemented method is provided for identifying words likely to be used in new combo-squatted domains of a target domain. The method includes selecting the target domain. The method further includes storing, in a memory device, a sequence of previously detected combo-squatted domains from period [t-W, t-1]. The sequence includes a set of words W. The method also includes obtaining trends associated with the target domain at time t. The method additionally includes obtaining, by a hardware processor responsive to the trends, a trend distribution associated with the target domain at time t. The method further includes ranking, by a likelihood, a set of words E that have been extracted from the trend distribution and are expected to be used in the future in the new combo-squatting domains, responsive to the set of words W.

20 Claims, 11 Drawing Sheets

TREND-AWARE COMBO-SQUATTING DETECTION

BACKGROUND

The present invention generally relates to computer domains, and more particularly to trend-aware combo-squatting detection.

Combo-squatting involves combining a domain name of a particular brand and a generic keyword to generate a new domain to be used for malicious purposes: domainname.COM, followers->domainnamefollowers.com.

Brands have the need to detect live squatted domains in order to pursue legal actions. Some brands even register squatted domains in advance as a proactive measure.

SUMMARY

According to aspects of the present invention, a computer-implemented method is provided for identifying words likely to be used in new combo-squatted domains of a target domain. The method includes selecting the target domain. The method further includes storing, in a memory device, a sequence of previously detected combo-squatted domains from period [t-W, t-1]. The sequence includes a set of words W. The method also includes obtaining trends associated with the target domain at time t. The method additionally includes obtaining, by a hardware processor responsive to the trends, a trend distribution associated with the target domain at time t. The method further includes ranking, by a likelihood, a set of words E that have been extracted from the trend distribution and are expected to be used in the future in the new combo-squatting domains, responsive to the set of words W.

According to other aspects of the present invention, a computer program product is provided for identifying words likely to be used in new combo-squatted domains of a target domain. The computer program product includes a non-transitory computer readable storage medium having program instructions embodied therewith. The program instructions are executable by a computer to cause the computer to perform a method. The method includes selecting the target domain. The method further includes storing a sequence of previously detected combo-squatted domains from period [t-W, t-1]. The sequence includes a set of words W. The method also includes obtaining trends associated with the target domain at time t. The method additionally includes obtaining, by a hardware processor responsive to the trends, a trend distribution associated with the target domain at time t. The method further includes ranking, by a likelihood, a set of words E that have been extracted from the trend distribution and are expected to be used in the future in the new combo-squatting domains, responsive to the set of words W.

According to yet other aspects of the present invention, a computer processing system is provided for identifying words likely to be used in new combo-squatted domains of a target domain. The computer processing system includes a memory device including program code stored thereon. The computer processing system further includes a hardware processor, operatively coupled to the memory device, and configured to run the program code stored on the memory device to select the target domain. The hardware processor is further configured to run the program code to store a sequence of previously detected combo-squatted domains from period [t-W, t-1], wherein the sequence includes a set of words W. The hardware processor is also configured to run the program code to obtain trends associated with the target domain at time t. The hardware processor is additionally configured to obtain, responsive to the trends, a trend distribution associated with the target domain at time t. The hardware processor is further configured to rank, by a likelihood, a set of words E that have been extracted from the trend distribution and are expected to be used in the future in the new combo-squatting domains, responsive to the set of words W.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to trend-aware combo-squatting detection.

Combo-squatting involves combining a domain name of a particular brand and a generic keyword to generate a new domain to be used for malicious purposes.

Embodiments of the present invention can be used to identifying words likely to be used in new combo-squatted domains of a target domain. In an embodiment, a sequence of previously detected combo-squatted domains from period [t-W, t-1] are stored, where the sequence includes a set of words W. Trends associated with the target domain at time t are obtained and, responsive to the trends, a trend distribution associated with the target domain at time t is obtained. A set of words E that have been extracted from the trend distribution and are expected to be used in the future in the new combo-squatting domains are ranked by a likelihood, responsive to the set of words W. In this way, new combo-squatted domains of the target domain can be determined.

Figure 1:
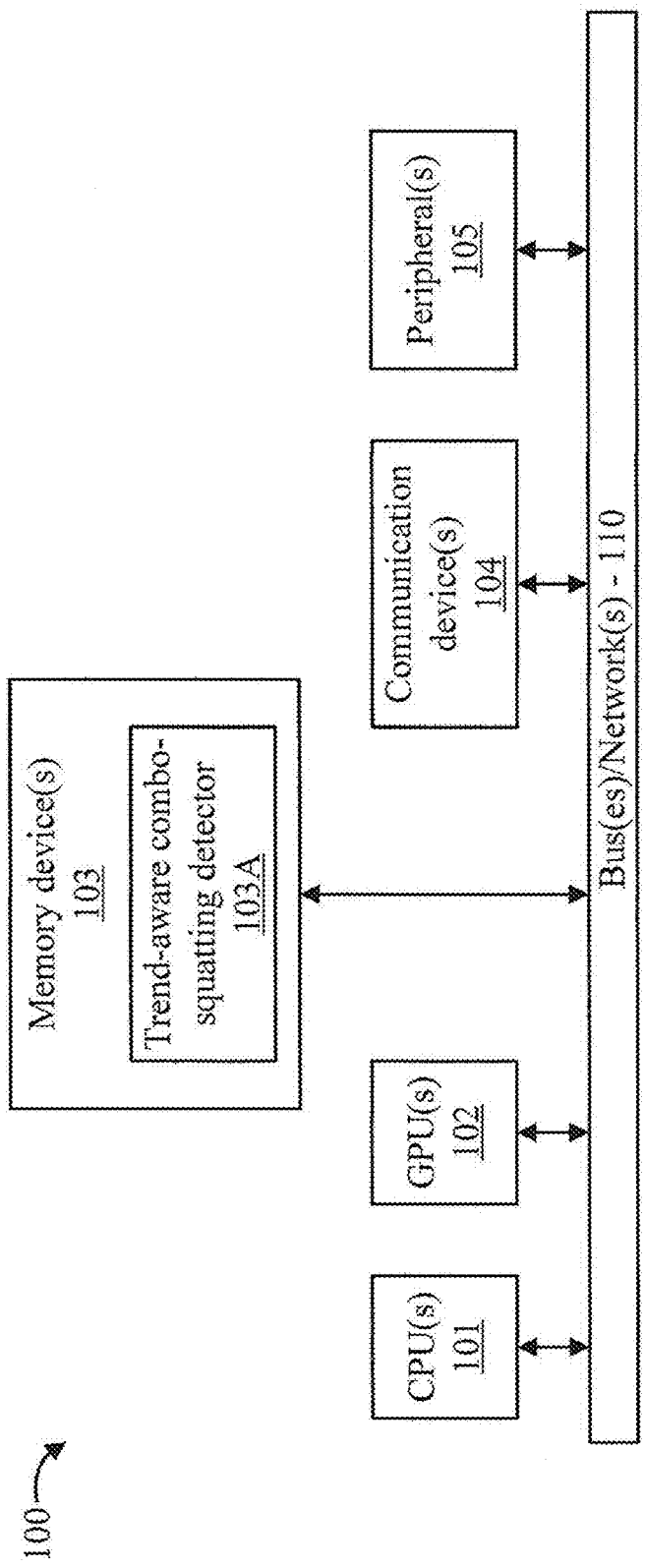
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention. In an embodiment, the memory devices 103 can include a trend-aware combo-squatting detector 103A.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 10-11). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

A description will now be given regarding two different environments in accordance with various aspects of the present invention. The first is a centralized-based embodiment, while the second is a distributed-based environment. These and other differences are readily appreciated by one of ordinary skill in the art given the teachings of the present invention provided herein.

Figure 2:
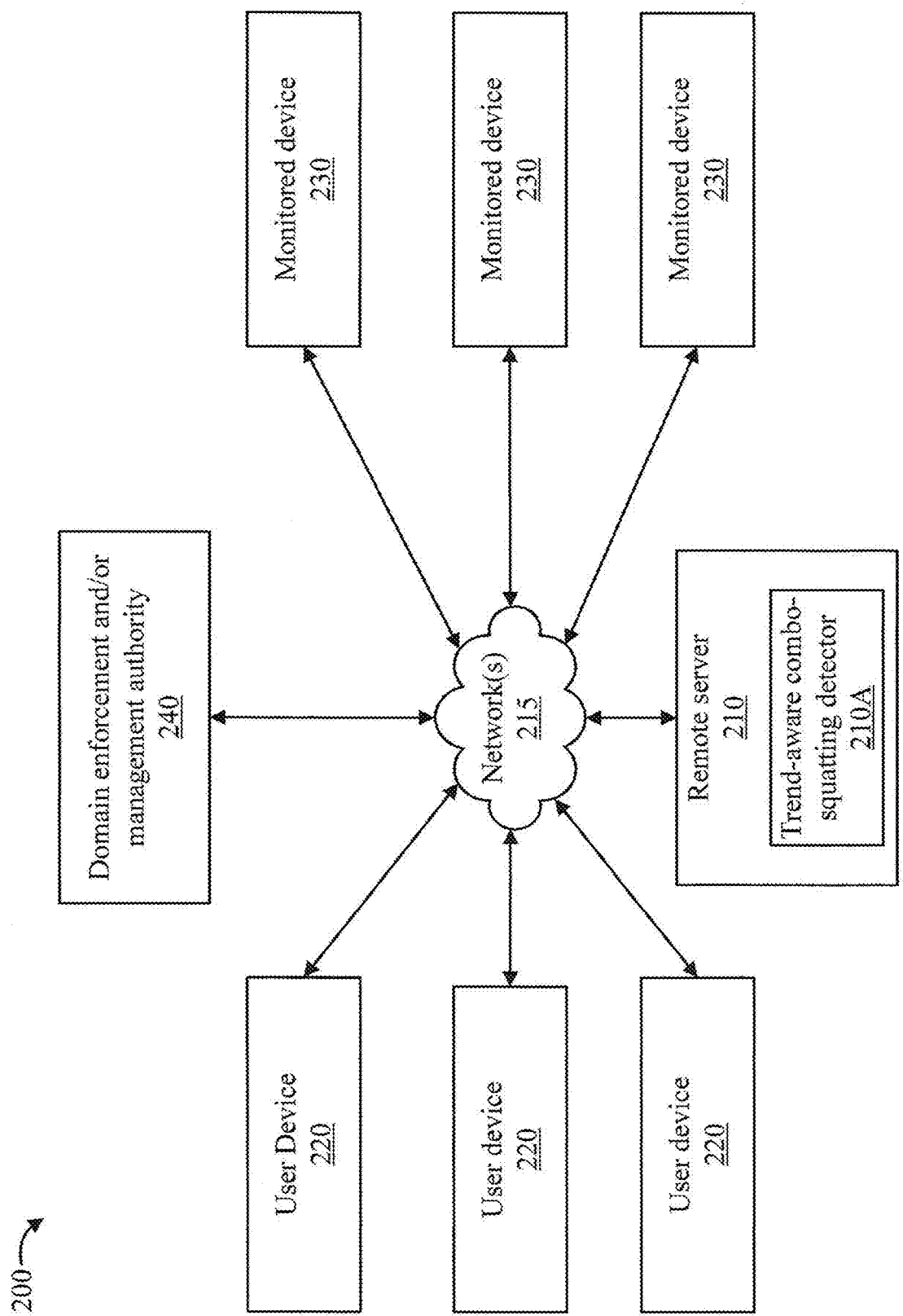
FIG. 2 is a block diagram showing an exemplary environment, in accordance with an embodiment of the present invention.

FIG. 2 is a block diagram showing an exemplary environment 200, in accordance with an embodiment of the present invention.

The environment 200 includes a remote server 210, a set of user devices 220, and a set of monitored devices 230. The remote server 210 can access the set of user devices 220 and the set of monitored devices 230 over one or more networks 215. Each of the set of user devices 220 and the set of monitored devices 230 can be configured similar to computer processing system 100 of FIG. 1 or can be implemented by a different device (e.g., a mobile phone, a tablet, a server, a server farm, a cloud computing system, etc.).

The remote server 210 includes a combo-squatted domain detector 210A. Combo-squatted domains are detected by detector 210A comparing domains of user devices 220 against domains of monitored devices 230. The set of monitored devices 230 can potentially include any computer or computing device accessible over the Internet. Moreover, a pre-processing step can be performed so that detailed brute force searches (all or most computers) can be avoided by simply having a common string of length N (N can be a user settable integer) be required in common with a domain in order to be further compared during actual processing in accordance with embodiments of the present invention. Of course, other techniques can be used while maintaining the spirit of the present invention.

In an embodiment, a quick comparison, e.g., via a pattern matching technique, can be used to see if a domain has changed from the past so that previously checked domains that have not changed do not need to be subject to the invention, but instead can be readily bypassed based on past results.

In an embodiment, the remote server 210 can generate, on the correct website/webpage, a warning about any detected combo-squatted domains. In an embodiment, the remote server 210 can generate a warning email and send the warning email to known members of the correct website/webpage. The warning (on the correct website/webpage) and/or the warning email can specify the specific combo-squatted domains that have been detected so that users can avoid them and any detrimental actions (malware, etc.) associated with them.

In an embodiment, a filter can be deployed at the access servers of the correct domain in order to identify traffic coming from the "fake" (combo-squatted domain) and either block it altogether or put up a warning informing the user that they just left an unauthorized and possibly malicious website/webpage. In this way, a user can immediately thereafter take action to stop any negative effects such as by stopping a credit card authorization previously made on the fake website/webpage, and/or so forth.

In an embodiment, remote server 210 can perform an action such as, for example, communicate its respective findings of a combos-squatted domain(s) to a domain enforcement and/or management authority 240 for action by the authority. Such authority can include, but is not limited to, the Internet Corporation for Assigned Names and Numbers (ICANN), a court of law, and/or so forth.

Figure 10:
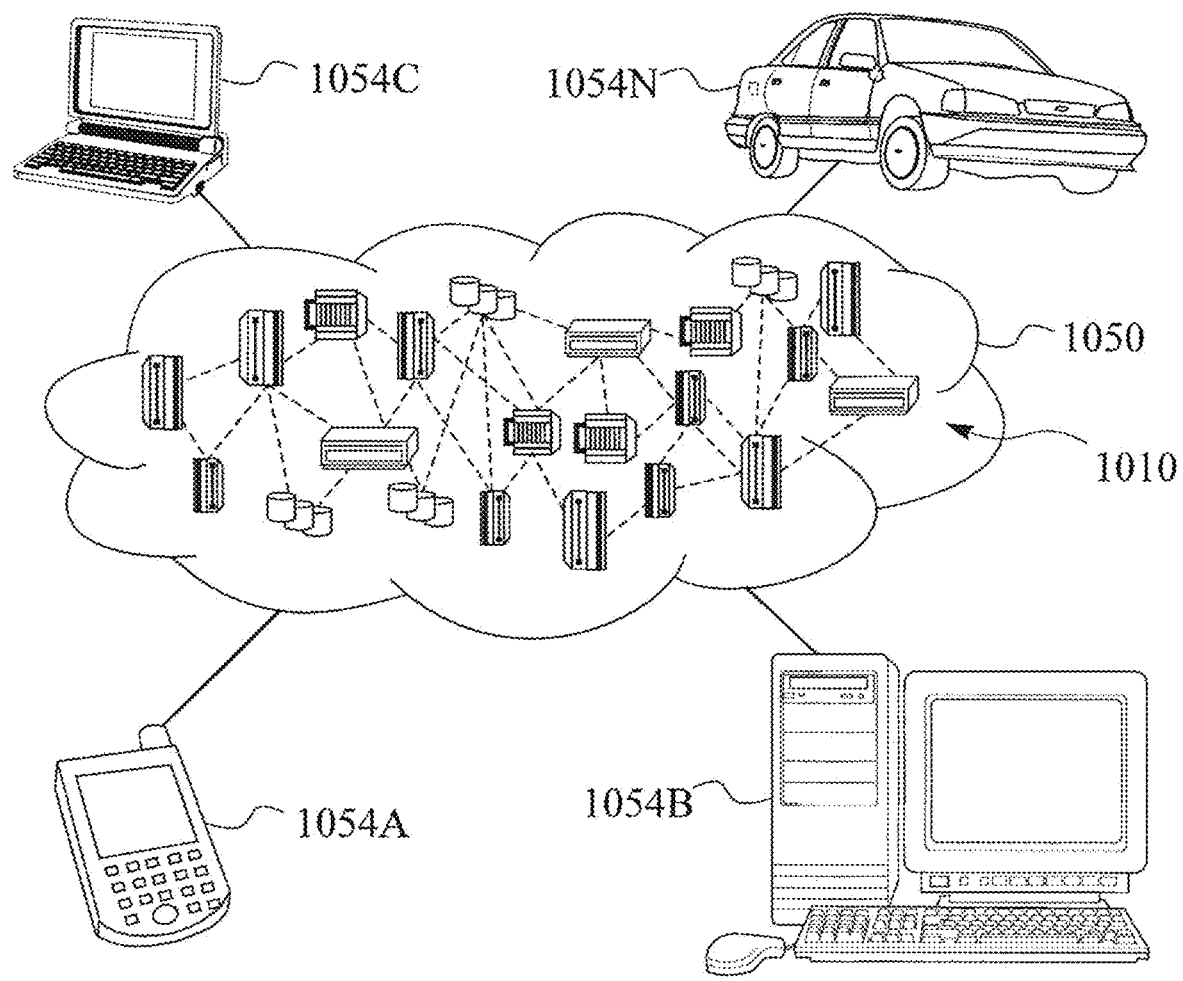
FIG. 10 is a block diagram showing an illustrative cloud computing environment having one or more cloud computing nodes with which local computing devices used by cloud consumers communicate, in accordance with an embodiment of the present invention.
Figure 11:
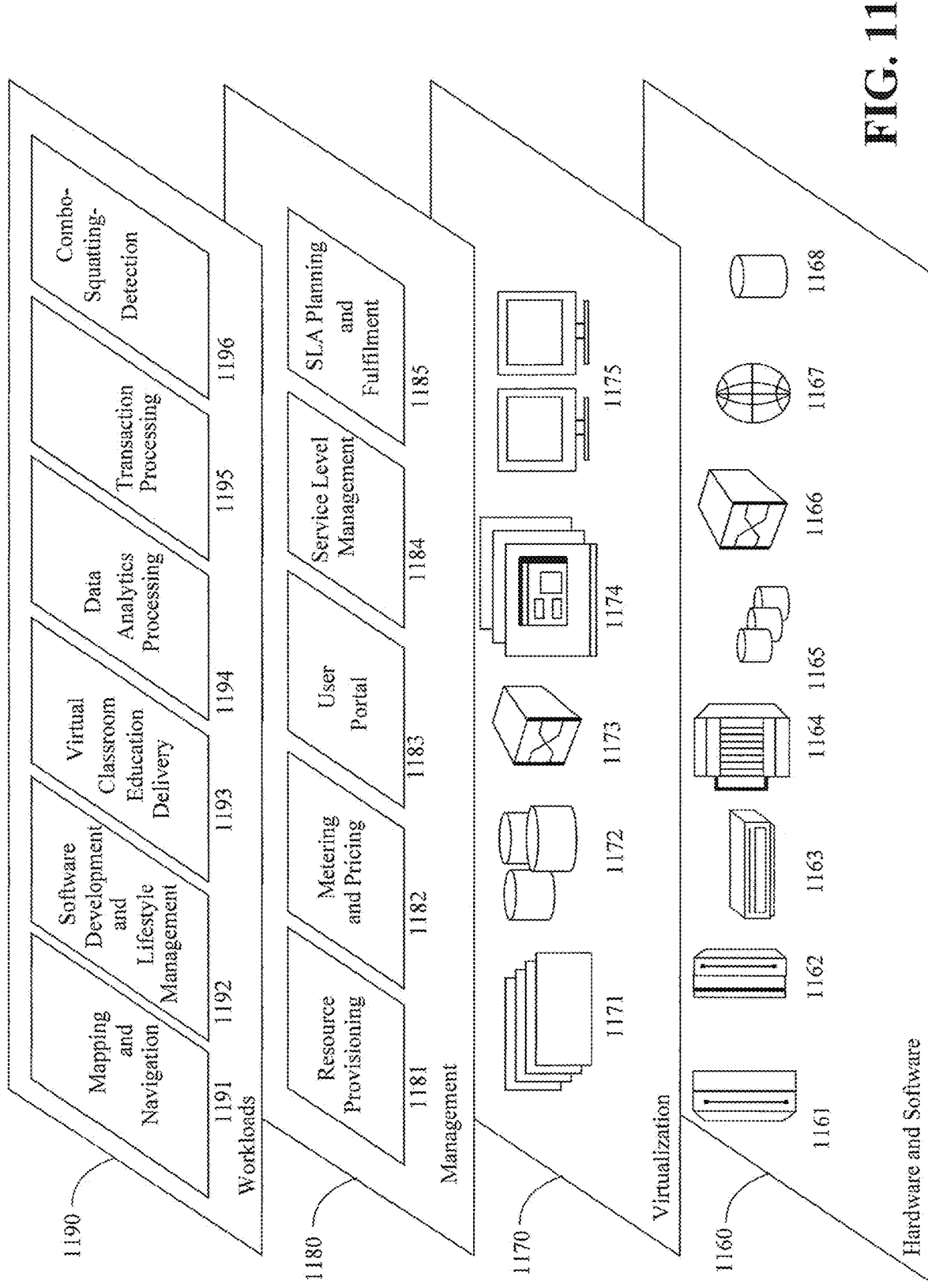
FIG. 11 is a block diagram showing a set of functional abstraction layers provided by a cloud computing environment, in accordance with an embodiment of the present invention.

In an embodiment, remote server 210 is implemented using a cloud configuration (see, e.g., FIGS. 10-11). For example, remote server 210 can be implemented in am=n Infrastructure as a Service (IAAS) or Software as a Service (SaaS) configuration.

Figure 3:
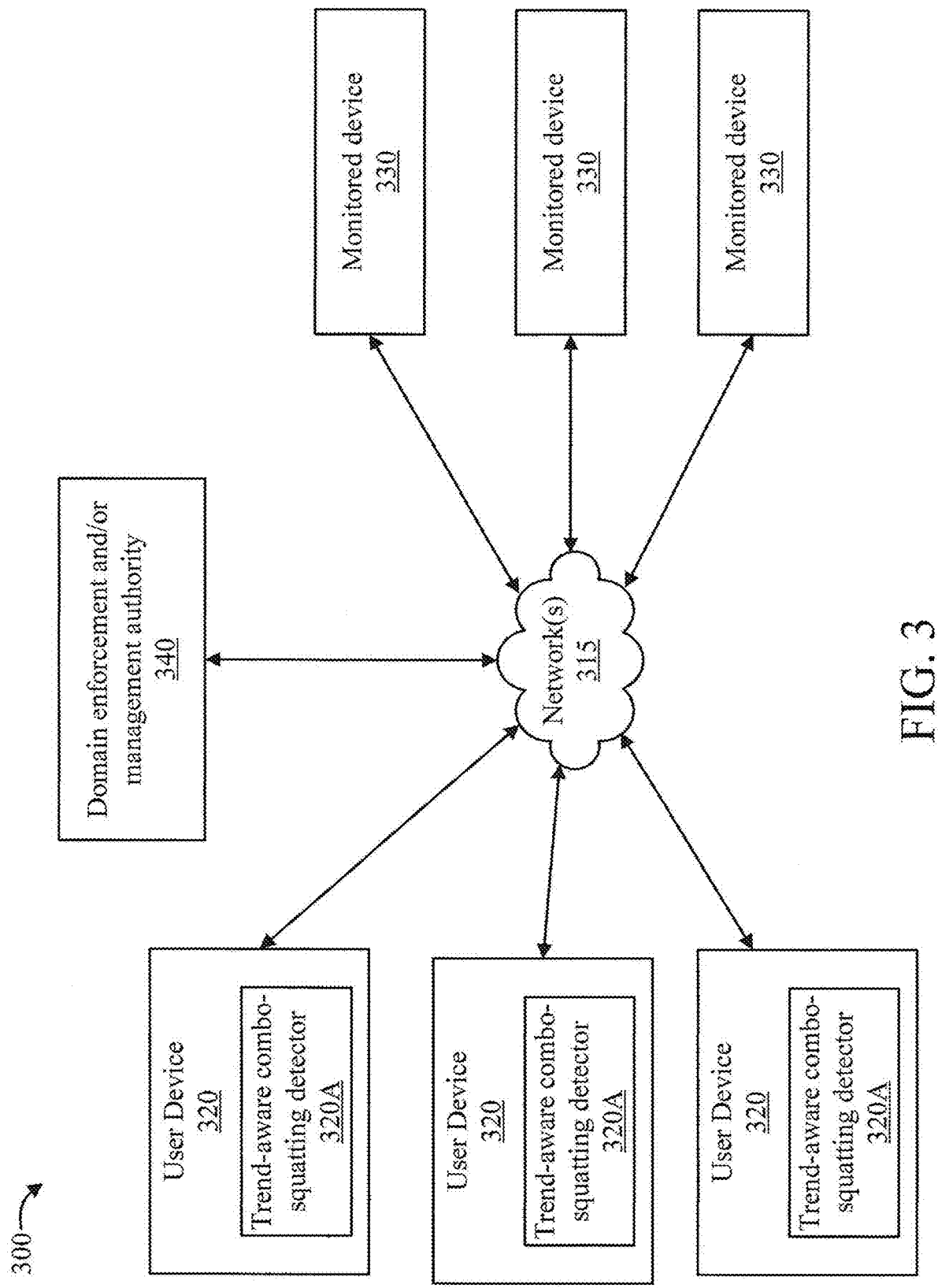
FIG. 3 is a block diagram showing another exemplary environment, in accordance with an embodiment of the present invention.

FIG. 3 is a block diagram showing another exemplary environment 300, in accordance with an embodiment of the present invention.

The environment 300 includes a set of user devices 320 and a set of monitored devices 330. The set of user devices 320 can access the set of monitored devices 330 over one or more networks 315. Each of the set of user devices 320 and the set of monitored devices 330 can be configured similar to computer processing system 100 of FIG. 1 or can be implemented by a different device (e.g., a mobile phone, a tablet, a server, a server farm, a cloud computing system, etc.).

Each of the user devices 320 can be configured to monitor one or more (e.g., related) domains by including a combo-squatted domain detector 320A. For example, each of the user devices 320 can include a combo-squatted domain detector 320A for comparing its (and/or its affiliates, subsidiaries, parent company, predesignated set, and so forth) domain(s) against domains of the monitored devices 320. The set of monitored devices 320 can potentially include any computer or computing device accessible over the Internet. Moreover, a pre-processing step can be performed so that detailed brute force searches (all or most computers) can be avoided by simply having a common string of length N (N can be a user settable integer) be required in common with a domain in order to be further compared during actual processing in accordance with embodiments of the present invention. Of course, other techniques can be used while maintaining the spirit of the present invention.

In an embodiment, a quick comparison, e.g., via a pattern matching technique, can be used to see if a domain has changed from the past so that previously checked domains that have not changed do not need to be subject to the invention, but instead can be readily bypassed based on past results.

In an embodiment, the set of user devices 320 can generate, on the correct website/webpage, a warning about any detected combo-squatted domains. In an embodiment, the set of user devices 320 can generate a warning email and send the email to known members of the correct website/webpage. The warning and/or email can specify the specific combo-squatted domains that have been detected so that users can avoid them and any detrimental actions (malware, etc.) associated with them.

In an embodiment, a filter can be deployed at the access servers of the correct domain in order to identify traffic coming from the "fake" (combo-squatted domain) and either block it altogether or put up a warning informing the user that they just left an unauthorized and possibly malicious website/webpage. In this way, a user can immediately thereafter take action to stop any negative effects such as by stopping a credit card authorization previously made on the fake website/webpage, and/or so forth.

In another embodiment based on environment 300, the user devices 320 can check for words expected to be used in the future for combo-squatted domains, and then check to see if websites visited by the user include such words. In an embodiment, the user devise 320 can back up or roll back any operations they performed at such "imposter" websites such as by undoing a commercial transaction, undoing a posting, etc.

In an embodiment, each of the user devices 320 can perform an action such as, for example, communicate its respective findings of a combos-squatted domain(s) to a domain enforcement and/or management authority 340 for action by the authority. Such authority can include, but is not limited to, the Internet Corporation for Assigned Names and Numbers (ICANN), a court of law, and/or so forth.

Figure 4:
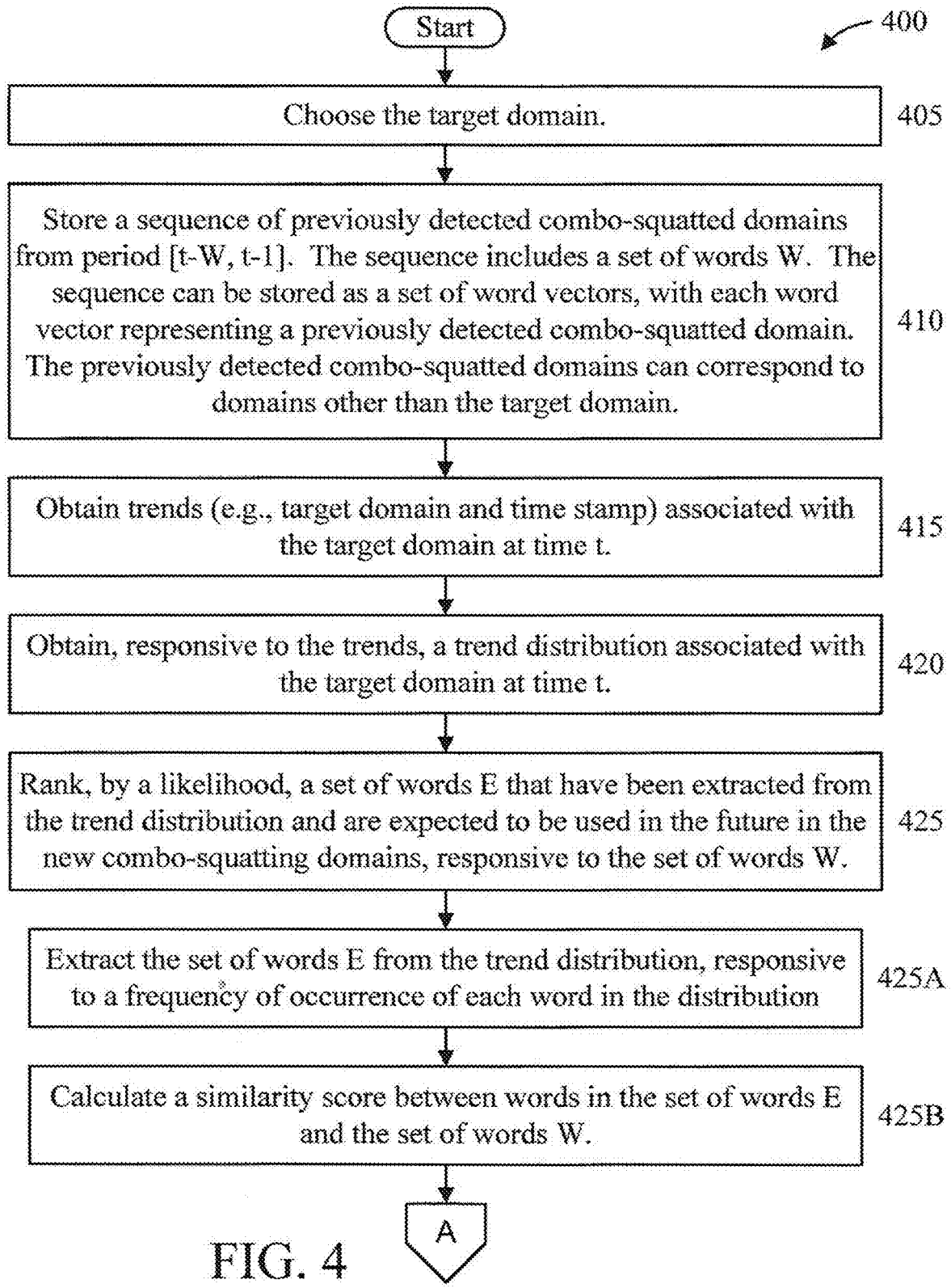
FIGS. 4-5 are flow diagrams showing an exemplary method for identifying words likely to be used in new combo-squatted domains of a target domain, in accordance with an embodiment of the present invention.
Figure 5:
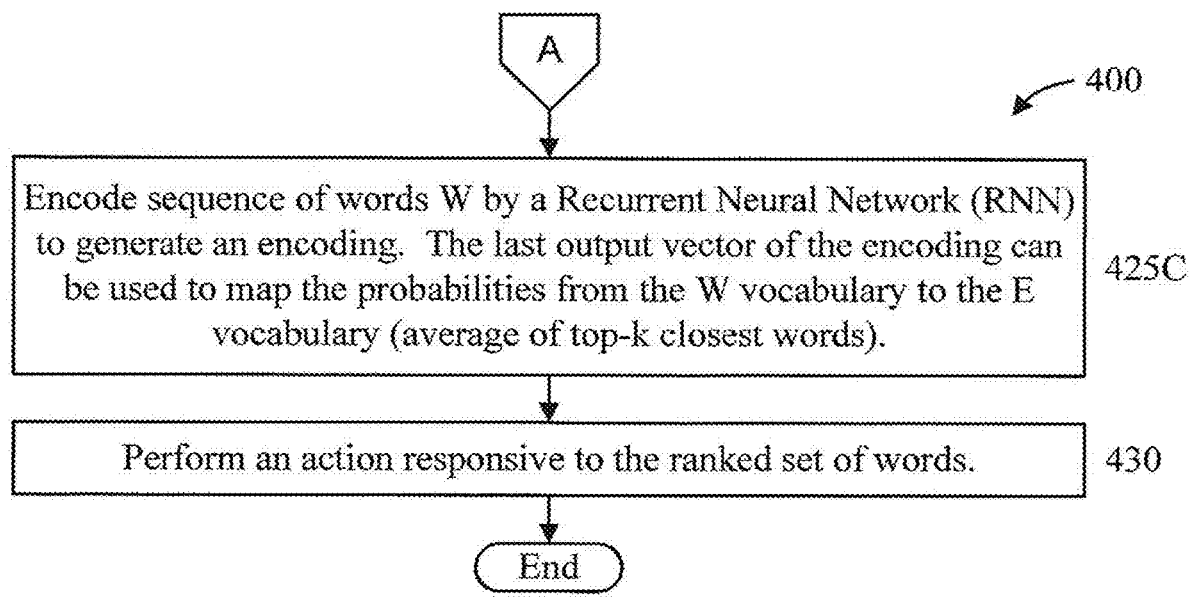
Figure 6:
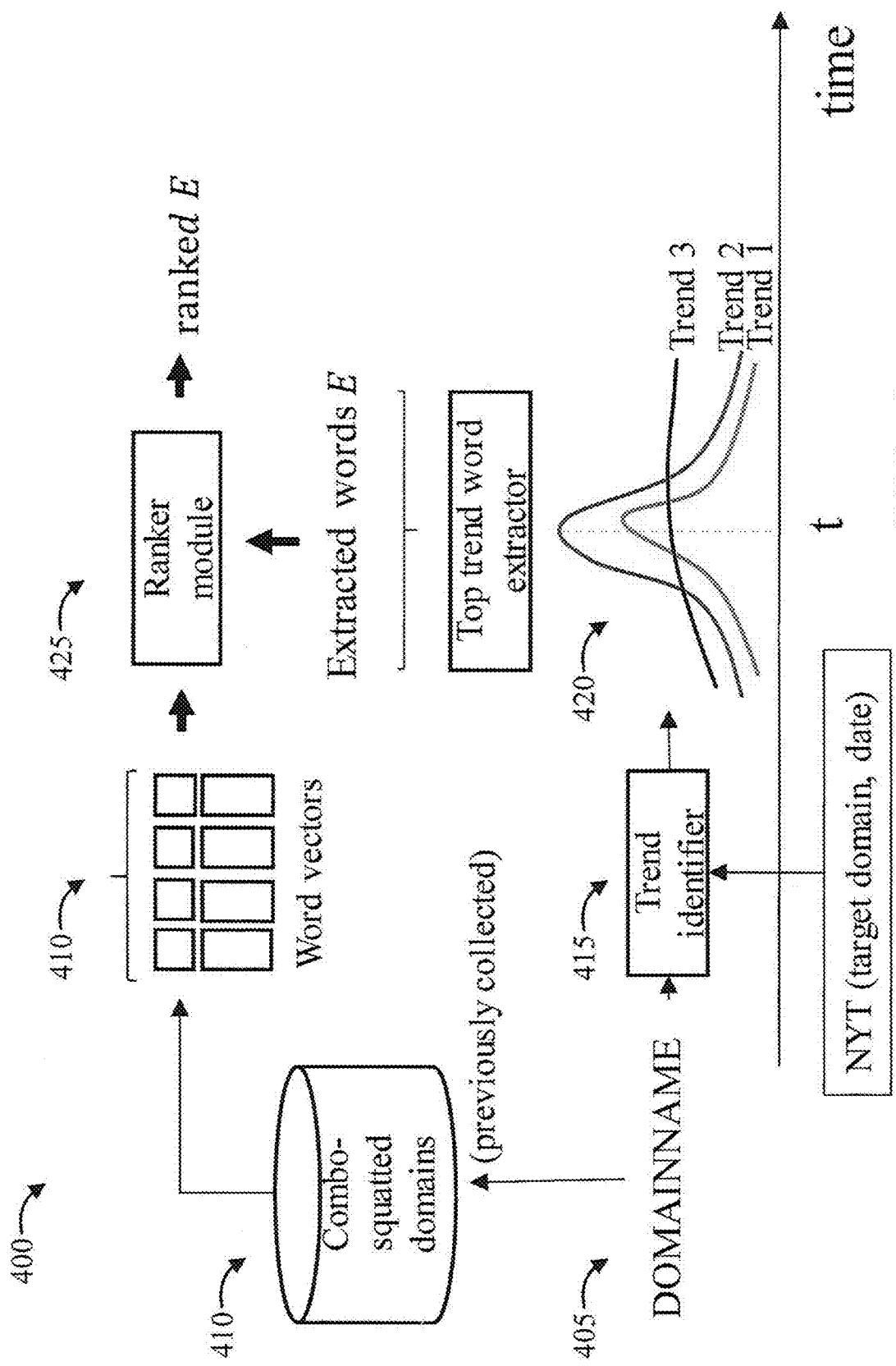
FIG. 6 is a block diagram graphically showing at least some portions of the method of FIGS. 4-5, in accordance with any embodiment of the present invention.
Figure 7:
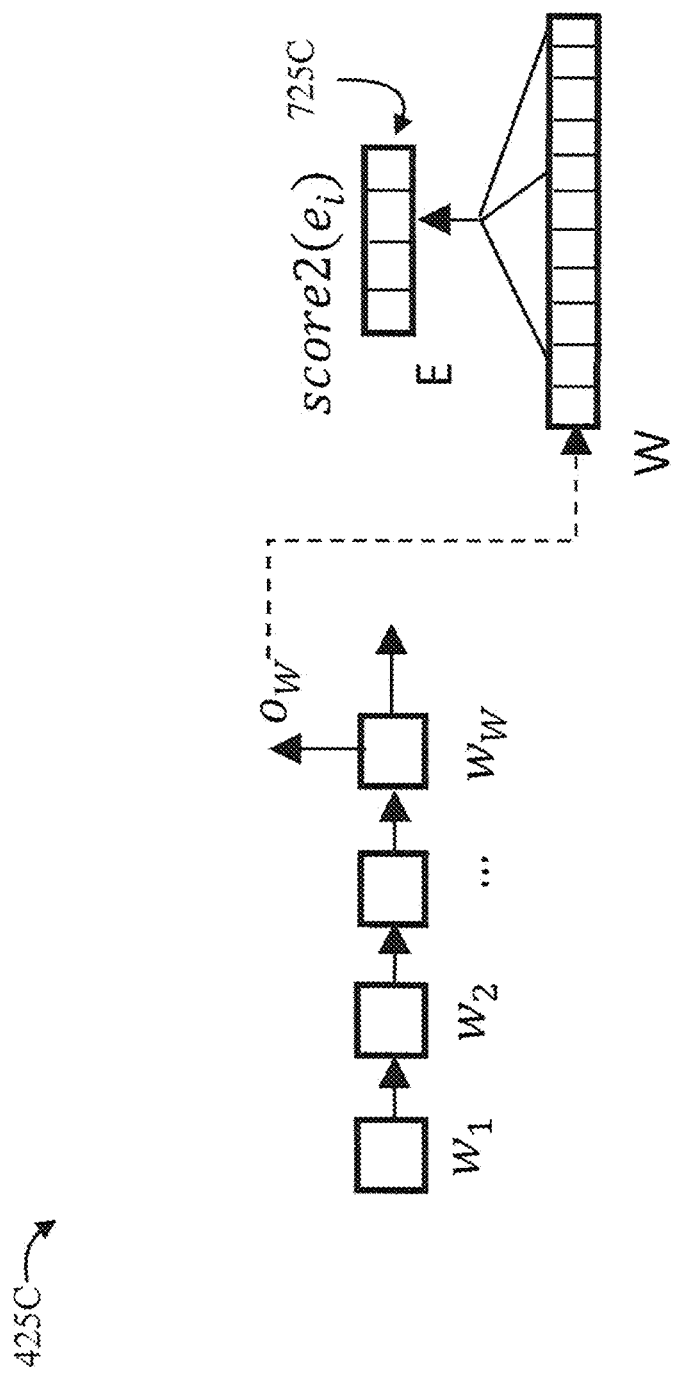
FIG. 7 is a block diagram graphically showing the encoding step of the method of FIGS. 4-5, in accordance with an embodiment of the present invention.

FIGS. 4-5 are flow diagrams showing an exemplary method 400 for identifying words likely to be used in new combo-squatted domains of a target domain, in accordance with an embodiment of the present invention. FIG. 6 is a block diagram graphically showing at least some portions of method 400 of FIGS. 4-5, in accordance with any embodiment of the present invention. FIG. 7 is a block diagram graphically showing the encoding step of method 400 of FIGS. 4-5, in accordance with an embodiment of the present invention.

At block 405, choose the target domain.

At block 410, store a sequence of previously detected combo-squatted domains from period [t-W, t-1]. The sequence includes a set of words W. In an embodiment, the sequence can be stored as a set of word vectors, with each word vector representing a previously detected combo-squatted domain. In an embodiment, the previously detected combo-squatted domains can correspond to domains other than the target domain.

Further regarding block 410, presuming that the current time is time t, then, the last W words that have used in the past are considered (W is a number that is defined by the user. For example, we can use the last 5 or 10 or any other number of past used words).

Then, [t-W, t-1] is the set of words used from time t-W to t-1.

[t-W, t-1]=[t-W, ..., t-3, t-2, t-1]=a sequence of W words used previously

At block 415, obtain trends (e.g., target domain and time stamp) associated with the target domain at time t.

At block 420, obtain, responsive to the trends, a trend distribution associated with the target domain at time t.

At block 425, rank, by a likelihood, a set of words E that have been extracted from the trend distribution and are expected to be used in the future in the new combo-squatting domains, responsive to the set of words W.

In an embodiment, block 425 includes block 425A.

At block 425A, extract the set of words E from the trend distribution, responsive to a frequency of occurrence of each word in the distribution.

At block 425B, calculate a similarity score between words in the set of words E and the set of words W.

At block 425C, encode sequence of words W by a Recurrent Neural Network (RNN) to generate an encoding. The last output vector 725C of the encoding can be used to map the probabilities from the W vocabulary to the E vocabulary (average of top-k closest words, see FIG. 7).

At block 430, perform an action responsive to the ranked set of words. This can include checking the ranked set of words against existing domains to detect combo-squatted domains. Further, this can include performing one or more actions responsive to such a detection. Exemplary actions are described herein.

Our model, as embodied by the RNN, captures a long term insight, coming from the sequence of previously detected combo-squatted domains, combined with a short term candidate vocabulary that is extracted from the current trends. In that sense, our approach uses a long term context to guide a short term word selection An RNN allow for learning a vector representation from a sequence, where such sequence can be anything. In the case of the present invention, the sequence is of words. In that sense, the input to the RNN is the sequence of words and the output is a single vector that characterizes the whole sequence (the values in this vector encapsulate the patterns and dependencies in the sequence).

A further description will now be given regarding block 425 of method 400 of FIGS. 4-5, in accordance with an embodiment of the present invention.

In general terms, the intent is to estimate which words are more likely to be used bad malicious actors to generate combo squatted domains for a target brand. For example, for the brand IBM, malicious actors could choose words such as "money" or "stocks" to register the domains "ibmmoney-.com" or "getibmstocks.com". respectively. Then, those domains can be used to conduct malicious activities such as phishing.

The present invention uses two types of input to estimate the most feasible words: (1) a set of words (W) previously used by malicious actors on the current target brand (2) a set of words (E) coming from recent trends associated to the target brand (e.g., for example, we can extract all the news articles associated to the current brand and obtain the most important words.)

The main hypothesis is that bad actors will take into account the trendy words associated to a brand to maximize the outcome of their attacks.

In that sense, the present invention basically tries to rank the words from the E set taking into account their relationship with the words in the W set. Then, the present invention selects the top E words after ranking and uses them as predictions for future combo squatted domains. In order to rank the words from the E set, we compute two scores and for each word and combine them.

The two scores, as described formally hereinafter, can be explained as follows:

Score 1: This score is the average similarity between a given word in the E set and all the words in the W set. In that sense, this score provides an estimation of how the word from E fits into the previously seen set of words W. The higher this score gets, the more suitable the word is in terms of how the brand has been attacked in the past.

Score 2: This score is computed based on learning the temporal dependencies among words that were used by malicious actors (words in the set W) and based on that estimate the likelihood of a word from e given the words.

In other words, using W as training data, a model (a RNN) is learned that is able to predict a word based on if the word has been seen in the past. Then, for a given word in E, the model is asked what is the probability of such word to appear. The model will output a probability. If the probability is low, then such word from E is not likely to appear. On the other hand, if the probability is high, then such word is a good candidate.

As can be seen, both scores look similar, but they are focusing on different aspects: score 1 takes into consideration the absolute similarity between a given word and a set of words used in the past, while score 2 incorporates a temporal dependency to estimate if such word is feasible in the context of W. Then, in order to obtain a final score, we combine score1 and score2. This combination can follow any configuration. In an embodiment, for simplicity, we can just take the average.

Thus, given a set of extracted words E we want to rank, and a sequence of W words coming from previously seen combo-squatted domains as follows.

For $e_i$ in E:

$$\text{score1}(e_i) = \frac{1}{|W|} \sum_{j=1}^{|W|} sim(e_i, w_j)$$

with sim being cosine similarity.

The sequence of words W extracted from the previously detected combo-squatted domains is encoded via a Recurrent Neural Network (RNN) to generate an encoding. The last output vector of the encoding, denoted by $O_W$, is used to estimate the closeness between each element of E and the previously seen set of W words, in the form of an additional score (score2) that is defined as: For each $e_i$ in E:

Find the group of k-closest words to $e_i$ in W. Let's denote this group as $W_i$ For each word in $W_i$, find its associated probability in $O_W$. Let's denote the resulting set of probabilities as $P_i$ Finally, score2 for $e_i$ will be the average of $P_i$:

$$\text{score2}(e_i) = \frac{1}{|P_i|} \sum p$$

The total score for each $e_i$ in E:

$$\text{score}(e_i) = \lambda \text{score1}(e_1) + (1-\lambda)\text{score2}(e_i)$$

with λ being a parameter to balance both scores.

Figure 8:
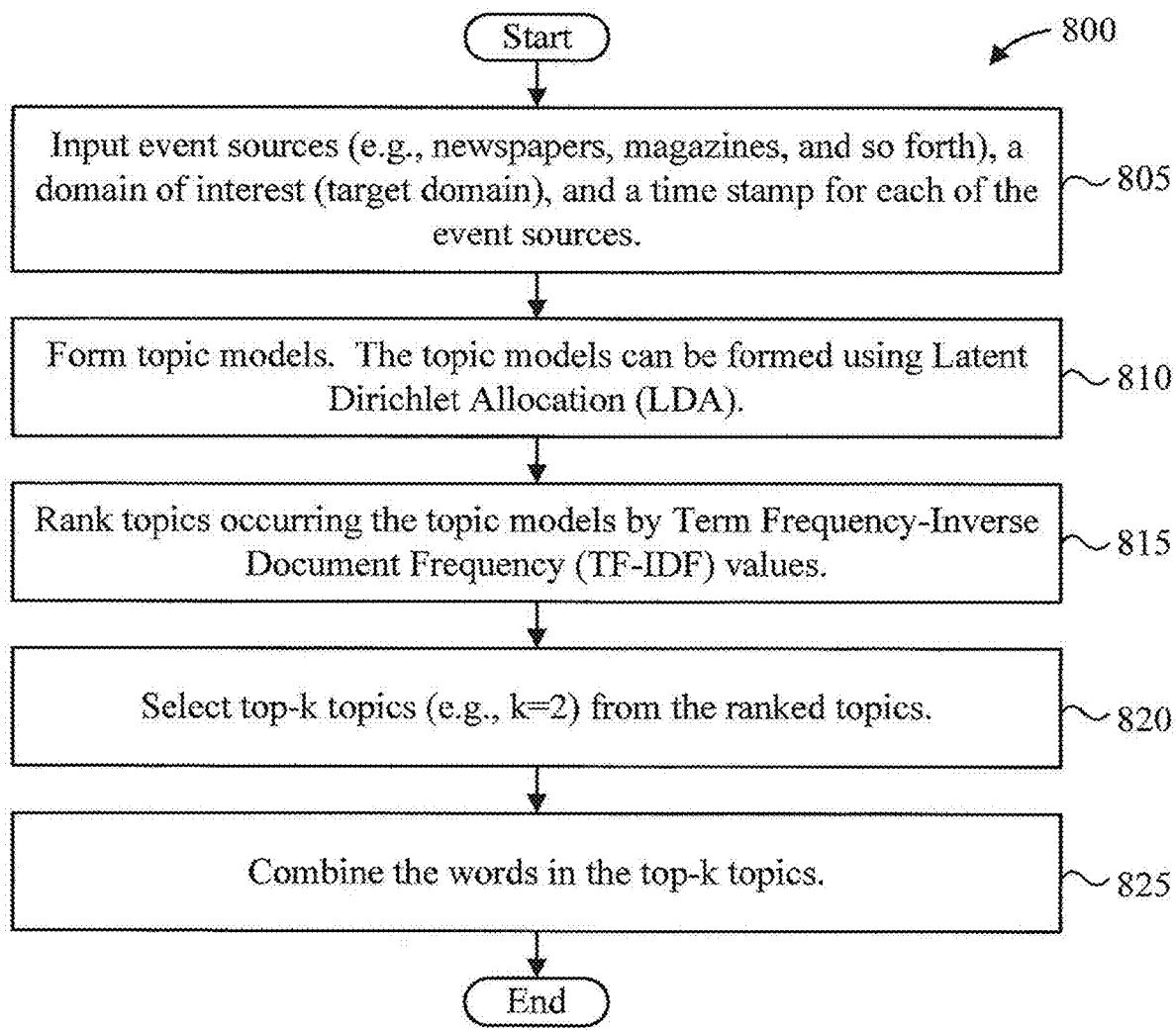
FIG. 8 is a flow diagram showing an exemplary method for extracting a set of words W from a trend distribution, in accordance with an embodiment of the present invention.
Figure 9:
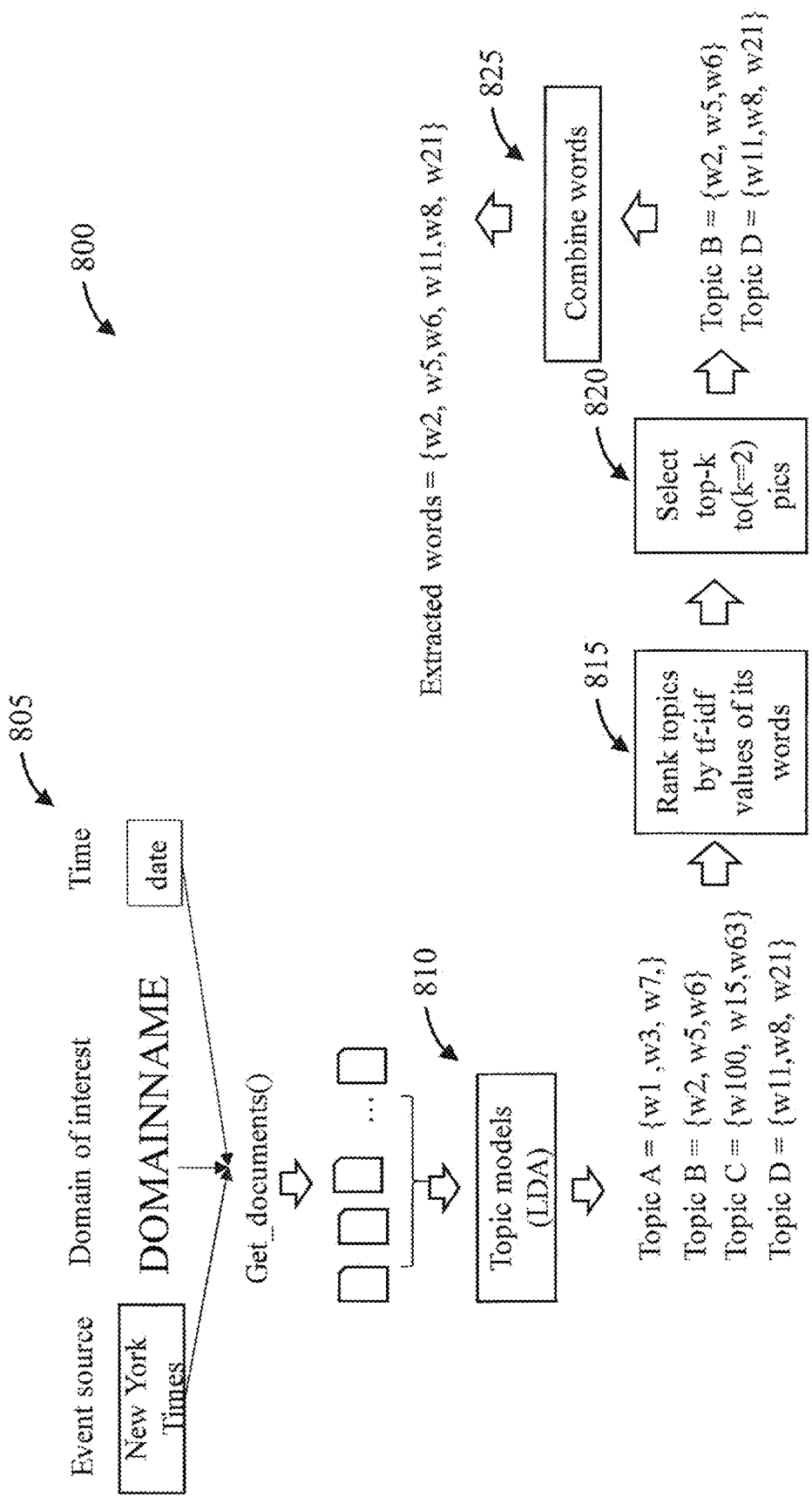
FIG. 9 is a block diagram graphically showing at least portion of the method of FIG. 8, in accordance with an embodiment of the present invention.

FIG. 8 is a flow diagram showing an exemplary method 800 for extracting a set of words W from a trend distribution, in accordance with an embodiment of the present invention. FIG. 9 is a block diagram graphically showing at least portion of method 800 of FIG. 8, in accordance with an embodiment of the present invention.

At block 805, input event sources (e.g., newspapers, magazines, and so forth), a domain of interest (target domain), and a time stamp for each of the event sources. Block 805 essentially involves obtaining articles that mention the domain of interest and that were created at a specific time. In an embodiment, the time stamp can be a time interval rather than just a specific date.

At block 810, form topic models. In an embodiment, the topic models can be formed using Latent Dirichlet Allocation (LDA).

Thus, for example:

Topic A={w1, w3, w7};

Topic B={w2, w5, w6};

Topic C={w100, w15, w63}; and

Topic D={w11, w8, w21}.

At block 815, rank topics occurring the topic models by Term Frequency-Inverse Document Frequency (TF-IDF) values.

At block 820, select top-k topics (e.g., k=2) from the ranked topics. Thus, for example, Topic B={w2, w5, w6};

Topic D={w11, w8, w21}.

At block 825, combine the words in the top-k topics. Thus, for example,

Extracted words={w2, w5, w6, w11, w8, w21}.

The extracted words characterize the trend associated with the brand (domain of interest) at a given time.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Referring now to FIG. 11, a set of functional abstraction layers provided by cloud computing environment 1050 (FIG. 10) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 11868.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 11883 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and trend-aware combo-squatting detection 1196.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for identifying words likely to be used in new combo-squatted domains of a target domain, comprising:
    selecting the target domain;
    storing, in a memory device, a sequence of previously detected combo-squatted domains from period [t-W, t-1], wherein the sequence includes a set of words W;
    obtaining trends associated with the target domain at time t;
    obtaining, by a hardware processor responsive to the trends, a trend distribution associated with the target domain at time t; and
    ranking, by a likelihood, a set of words E that have been extracted from the trend distribution and are expected to be used in the future in the new combo-squatting domains, responsive to the set of words W.

2. The computer-implemented method of claim 1, wherein the set of words W is encoded by a Recurrent Neural Network to generate an encoding and a last output vector of the encoding is used to map probabilities from the set of words W to the set of words E.

3. The computer-implemented method of claim 2, wherein the probabilities are determined by calculating an average of top k-most probable ones of the words from the set of words E.

4. The computer-implemented method of claim 1, wherein the likelihood is computed based on a similarity measure between words in the set of words W and words in the set of words E.

5. The computer-implemented method of claim 1, wherein the set of words E is obtained by:
    inputting event sources, the target domain, and a time stamp for each of the event sources;
    forming topic models from words extracted from the event sources;

ranking topics occurring in the topic models by Term Frequency-Inverse Document Frequency values;
selecting top-k topics from the ranked topics; and
combining the words in the top-k topics.

6. The computer-implemented method of claim 5, wherein the words are extracted from the event sources using Latent Dirichlet Allocation.

7. The computer-implemented method of claim 1, wherein the method is performed by a centralized remote server.

8. The computer-implemented method of claim 1, wherein the method is performed by a plurality of servers, each responsible for a respective set of related target domains.

9. The computer-implemented method of claim 1, further comprising bypassing the method responsive to results of a string search of length N between the target domain and a currently evaluated domain indicating a dissimilarity therebetween, where N is a user-selectable integer.

10. The computer-implemented method of claim 1, further comprising:
determining if an encountered domain has changed from a past check using a pattern matching technique; and
bypassing the method if the domain has not changed from the past check.

11. The computer-implemented method of claim 1, further comprising generating, on a correct webpage, a warning about any detected combo-squatted domains, wherein the warning email specifies any specific combo-squatted domains that have been detected.

12. The computer-implemented method of claim 1, further comprising generating a warning email and send the warning email to known members of a correct webpage, wherein the warning email specifies any specific combo-squatted domains that have been detected.

13. The computer-implemented method of claim 1, further comprising:
identifying traffic being redirected from a detected combo-squatted domain; and
blocking the re-directed traffic and providing a warning to a user that the user has left a potentially malicious site.

14. A computer program product for identifying words likely to be used in new combo-squatted domains of a target domain, the computer program product comprising a non-transitory computer readable storage medium having program instructions embodied therewith, the program instructions executable by a computer to cause the computer to perform a method comprising:
selecting the target domain;
storing a sequence of previously detected combo-squatted domains from period [t-W, t-1], wherein the sequence includes a set of words W;
obtaining trends associated with the target domain at time t;
obtaining, responsive to the trends, a trend distribution associated with the target domain at time t; and
ranking, by a likelihood, a set of words E that have been extracted from the trend distribution and are expected to be used in the future in the new combo-squatting domains, responsive to the set of words W.

15. The computer program product of claim 14, wherein the set of words W is encoded by a Recurrent Neural Network to generate an encoding and a last output vector of the encoding is used to map probabilities from the set of words W to the set of words E.

16. The computer program product of claim 15, wherein the probabilities are determined by calculating an average of top k-most probable ones of the words from the set of words E.

17. The computer program product of claim 14, wherein the likelihood is computed based on a similarity measure between words in the set of words W and words in the set of words E.

18. The computer program product of claim 14, wherein the set of words E is obtained by:
inputting event sources, the target domain, and a time stamp for each of the event sources;
forming topic models from words extracted from the event sources;
ranking topics occurring in the topic models by Term Frequency-Inverse Document Frequency values;
selecting top-k topics from the ranked topics; and
combining the words in the top-k topics.

19. The computer program product of claim 14, wherein the method is performed by a plurality of servers, each responsible for a respective set of related target domains.

20. A computer processing system for identifying words likely to be used in new combo-squatted domains of a target domain, comprising:
a memory device including program code stored thereon;
a hardware processor, operatively coupled to the memory device, and configured to run the program code stored on the memory device to
select the target domain;
store a sequence of previously detected combo-squatted domains from period [t-W, t-1], wherein the sequence includes a set of words W;
obtain trends associated with the target domain at time t;
obtain, responsive to the trends, a trend distribution associated with the target domain at time t; and
rank, by a likelihood, a set of words E that have been extracted from the trend distribution and are expected to be used in the future in the new combo-squatting domains, responsive to the set of words W.

* * * * *